United States Patent
Grethel et al.

(10) Patent No.: US 8,042,672 B2
(45) Date of Patent: Oct. 25, 2011

(54) HYDRAULIC ARRANGEMENT FOR CONTROLLING A TWIN-CLUTCH TRANSMISSION OF A MOTOR VEHICLE

(75) Inventors: Marco Grethel, Buehlertal (DE); Martin Staudinger, Ettlingen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 3 days.

(21) Appl. No.: 12/554,368

(22) Filed: Sep. 4, 2009

(65) Prior Publication Data

US 2009/0321209 A1   Dec. 31, 2009

Related U.S. Application Data

(63) Continuation of application No. PCT/DE2008/000294, filed on Feb. 18, 2008.

(60) Provisional application No. 60/905,338, filed on Mar. 7, 2007, provisional application No. 60/936,537, filed on Jun. 21, 2007.

(30) Foreign Application Priority Data

Jun. 22, 2007 (DE) .......... 10 2007 029 287
Nov. 29, 2007 (DE) .......... 10 2007 057 449

(51) Int. Cl.
*F16D 25/12* (2006.01)
*F16D 13/74* (2006.01)
*F16H 57/04* (2010.01)

(52) U.S. Cl. .............. 192/48.611; 192/85.61; 192/113.3

(58) Field of Classification Search ............... 192/113.3, 192/113.35
See application file for complete search history.

(56) References Cited

U.S. PATENT DOCUMENTS

| | | | | |
|---|---|---|---|---|
| 3,760,918 A | * | 9/1973 | Wetrich et al. | 192/48.607 |
| 3,823,801 A | * | 7/1974 | Arnold | 192/48.618 |
| 4,192,337 A | * | 3/1980 | Alderson et al. | 137/101 |
| 5,222,418 A | | 6/1993 | Murota | |
| 5,727,389 A | | 3/1998 | Harries | |
| 5,845,756 A | * | 12/1998 | Dairokuno et al. | 192/85.61 |
| 6,631,651 B2 | * | 10/2003 | Petrzik | 74/346 |
| 7,311,187 B2 | * | 12/2007 | Koenig et al. | 192/48.8 |
| 2005/0235637 A1 | * | 10/2005 | Muller et al. | 60/420 |
| 2006/0120876 A1 | | 6/2006 | Kitano et al. | |

(Continued)

FOREIGN PATENT DOCUMENTS

DE           100 20 187 A    10/2001
(Continued)

OTHER PUBLICATIONS

Machine translation of DE 102005015911 downloaded from EPO website on Nov. 15, 2010.*

*Primary Examiner* — Richard M. Lorence
(74) *Attorney, Agent, or Firm* — Lucas & Mercanti, LLP

(57) ABSTRACT

A hydraulic arrangement for controlling a twin-clutch transmission of a motor vehicle. The hydraulic arrangement has a hydraulic energy source for supplying the hydraulic arrangement with hydraulic energy with a hydraulic medium; a pressure accumulator for storing the hydraulic energy; and a clutch cooling device for cooling clutches of the twin-clutch transmission with the hydraulic medium. A transmission lubrication process and/or a transmission cooling process for cooling and/or lubricating a transmission of the twin-clutch transmission with the hydraulic medium is/are carried out, in addition to a prioritization process for prioritizing the supply of the pressure accumulator before the clutch cooling, and the clutch cooling before the transmission lubrication and/or transmission cooling by means of the hydraulic medium.

16 Claims, 4 Drawing Sheets

U.S. PATENT DOCUMENTS

2006/0223670 A1 10/2006 Nishikawa et al.

FOREIGN PATENT DOCUMENTS

| DE | 10 2004 058 261 A | 6/2006 |
| --- | --- | --- |
| DE | 10 2005 013 137 A | 9/2006 |
| DE | 10 2005 015 911 X | 10/2006 |
| EP | 1 602 849 A | 12/2005 |
| WO | 02/40886 A | 5/2002 |
| WO | 03/087627 A | 10/2003 |
| WO | 2004/092618 A | 10/2004 |

* cited by examiner

HYDRAULIC ARRANGEMENT FOR CONTROLLING A TWIN-CLUTCH TRANSMISSION OF A MOTOR VEHICLE

This application is a continuation application of PCT/DE2008/000294 filed Feb. 18, 2008, which in turn claims the priority of U.S. 60/905,338, filed Mar. 7, 2007, U.S. 60/936,537, filed Jun. 21, 2007, DE 10 2007 029 287.4, filed Jun. 22, 2007, and DE 10 2007 057 449.7, filed Nov. 29, 2007, the priority of these applications is hereby claimed and these applications are incorporated by reference herein.

The present invention relates to a hydraulic arrangement for controlling a twin-clutch transmission of a motor vehicle, having a hydraulic energy source for supplying hydraulic energy to the hydraulic arrangement by means of a hydraulic medium, having a pressure accumulator for storing the hydraulic energy, and having a clutch cooling means for cooling clutches of the twin-clutch transmission by means of the hydraulic medium.

It is known that oil pumps, which are connected to an internal combustion engine of the motor vehicle, are used to supply oil to a transmission. Furthermore, it is known that the transmissions are supplied with oil by means of an oil delivery pump which is driven by electric motor, known by the term power pack. Such a power pack can also be used in conjunction with the burner pump, in which case the power pack can be actuated, for example, to make available large volume flows of oil or hydraulic medium which are required for a brief period. In addition it is known that a pressure accumulator can be connected to these hydraulic systems.

The object of the invention is to improve further a hydraulic arrangement of the type mentioned at the beginning, in particular to reduce the loading on the oil delivery pump which is driven by electric motor, preferably to extend the hydraulic arrangement with further functionalities, and preferably to minimize and/or generate according to requirements the hydraulic energy which is necessary to supply the hydraulic arrangement.

The object is achieved in a hydraulic arrangement for controlling a twin-clutch transmission of a motor vehicle, having a hydraulic energy source for supplying hydraulic energy to the hydraulic arrangement by means of a hydraulic medium, having a pressure accumulator for storing the hydraulic energy, and having a clutch cooling means for cooling clutches of the twin-clutch transmission by means of the hydraulic medium, in that a transmission lubrication means and/or transmission cooling means for cooling and/or lubricating a transmission of the twin-clutch transmission by means of the hydraulic medium and a prioritization means or prioritization device for prioritizing the supply of the hydraulic medium to the pressure accumulator over that to the clutch cooling means, and for prioritizing the supply of the hydraulic medium to the clutch cooling means over that to the transmission lubricating means and/or transmission cooling means. The hydraulic arrangement preferably has the additional functionality of cooling and/or lubricating the transmission of the twin-clutch transmission. The hydraulic medium can advantageously be fed by means of the hydraulic arrangement to the transmission of the twin-clutch transmission for cooling and/or lubricating. Further consumers can also be advantageously supplied with the hydraulic medium in a prioritized fashion by means of the prioritization means. In this way it is advantageously possible to ensure that the consumers of the hydraulic arrangement are supplied appropriately in terms of requirements and/or functions. Hydraulic energy, which is made available by means of the hydraulic energy source, can advantageously be fed to the downstream consumers of the hydraulic arrangement only to a degree which is as low as possible and is required in accordance with predefined priorities. An overall concept of the hydraulic arrangement, and of the twin-clutch transmission, which can be actuated thereby, is advantageously obtained with comparatively low transmission losses due to the integrated transmission lubrication and/or transmission cooling, and at the same time required functionalities of a clutch actuator system or transmission actuator system, the clutch cooling means and the transmission cooling means can be taken into account.

The object is also achieved in a hydraulic arrangement for controlling a twin-clutch transmission of a motor vehicle, having a hydraulic energy source for supplying hydraulic energy to the hydraulic arrangement by means of a hydraulic medium, having a pressure accumulator for storing the hydraulic energy, and having a clutch cooling means for cooling clutches of the twin-clutch transmission by means of the hydraulic medium, in that the hydraulic energy source has a dual-flow electric pump. The dual-flow electric pump can advantageously be assigned to different consumers of the hydraulic arrangement, permitting a more differentiated supply of hydraulic energy to consumers which are connected downstream.

Preferred exemplary embodiments of the hydraulic arrangement are distinguished in that the dual-flow electric pump has a first flow which can be connected upstream of the pressure accumulator. The first flow can advantageously be designed to charge the pressure accumulator with hydraulic energy, and can, for example, provide a comparatively high pressure level. In this context it is conceivable to configure the first flow for a comparatively small volume flow.

Further preferred exemplary embodiments of the hydraulic arrangement are distinguished by the fact that the dual-flow electric pump has a second flow which can be connected upstream of the clutch cooling means. The second flow can advantageously be configured to generate a comparatively large volume flow at a comparatively low pressure level. The clutch cooling means requires comparatively large volume flows with a comparatively low pressure level.

Further preferred exemplary embodiments of the hydraulic arrangement are distinguished by the fact that the first flow can be connected upstream of the clutch cooling means. The first flow can advantageously also be used for cooling the clutch, in which case the entire volume flow generated by means of the electric pump of the hydraulic medium can be fed to the clutch cooling means.

Further preferred exemplary embodiments of the hydraulic arrangement are distinguished by the fact that the first flow is connected upstream of the pressure accumulator via a non-return valve. The non-return valve can advantageously prevent the hydraulic medium from flowing back in the direction of the first flow of the electric pump. As a result, an operating state of the first flow at a comparatively low pressure level is advantageously made possible, and said pressure level can be used, for example, for cooling the clutch in this context.

Further preferred exemplary embodiments of the hydraulic arrangement are distinguished by the fact that the first flow can be connected upstream of the clutch cooling means via a first valve. The first flow can advantageously be switched in the direction of the clutch cooling means by means of the first valve, in which case the pressure level drops and the non-return valve connected between the first flow and the pressure accumulator is locked. It is advantageously possible to assign the first flow to the clutch cooling means via the first valve, or optionally to shut off the first flow in the direction of the clutch cooling means, with the result that the pressure level is increased to such an extent that the pressure accumulator can be charged.

Further preferred exemplary embodiments of the hydraulic arrangement are distinguished by the fact that the first valve is embodied as a proportional valve. Intermediate states can advantageously be adopted, with the result that, for example, a partial volume flow of the first flow can be used for cooling the clutch, and a second partial volume flow can be used for charging the pressure accumulator.

Further preferred exemplary embodiments of the hydraulic arrangement are distinguished by the fact that the first valve can be actuated by means of a proportional magnet. The intermediate steps of the first valve can be set by applying an electric current by means of the proportional magnet.

Further preferred exemplary embodiments of the hydraulic arrangement are distinguished by the fact that in the currentless state of the proportional magnet of the first valve a total flow of the hydraulic medium, which can be generated by means of the hydraulic energy source, can be fed to the clutch cooling means. It is advantageous that the cooling of the clutch can still be ensured in the event, for example, of a power failure of an actuation means of the hydraulic arrangement.

Further preferred exemplary embodiments of the hydraulic arrangement are distinguished by the fact that the hydraulic energy source has the electric pump and a burner pump, which can be driven by means of an internal combustion engine of the motor vehicle. The burner pump supplies, as a function of the operating state of the internal combustion engine of the motor vehicle, a corresponding variable volume flow of the hydraulic medium, as far as a volume flow of zero, if the internal combustion engine is switched off. This may occur, for example, if a start/stop functionality is implemented. In this operating state, the electric pump of the hydraulic energy source can advantageously also supply hydraulic energy to the downstream consumers of the hydraulic arrangement. A stationary state of the internal combustion engine can occur even with hybrid drives, in which case, for example, it is advantageously possible to cool a hybrid drive clutch despite the stationary state.

Further preferred exemplary embodiments of the hydraulic arrangement are distinguished by the fact that the prioritization means has the first valve, a second valve, connected downstream of the burner pump, and a third valve, connected downstream of the second valve. The three valves can advantageously be used to supply hydraulic energy from the hydraulic energy source in a prioritized fashion to the transmission lubricating means and/or cooling means, the clutch cooling means and the pressure accumulator. The second and third valves can, for this purpose, be configured as volume flow dividers, for example.

Further preferred exemplary embodiments of the hydraulic arrangement are distinguished by the fact that the second valve is connected upstream of the first valve, wherein a volume flow of the hydraulic medium which can be delivered by means of the burner pump can be fed optionally either to the third valve or to the first valve. The second valve can advantageously divide a volume flow, which can be generated by means of the burner pump, in the direction of the first valve and/or of the third valve. "Optionally" can be understood to mean switching over or else any desired volume flow ratio in the direction of the first and/or third valve. For this purpose, the second valve can be configured as a proportional valve. The volume flow of the burner pump which varies greatly as a function of the operating state of the internal combustion engine can be fed to the clutch cooling means via the first valve.

Further preferred exemplary embodiments of the hydraulic arrangement are distinguished by the fact that the second valve has a tank return line for at least partially short-circuiting the burner pump. Alternatively, a portion which is not required or 100% of the volume flow which can be delivered by means of the burner pump can advantageously be fed directly again to an intake side of the burner pump, in which case the energy consumption or shaft power of the burner pump can be minimized.

Further preferred exemplary embodiments of the hydraulic arrangement are distinguished by the fact that the third valve can optionally be connected upstream of a clutch controller and/or gear speed controller of the hydraulic arrangement, and upstream of the first valve. The third valve can advantageously branch off in the direction of the first valve a portion of the volume flow which is not required by the clutch actuation means and/or gear speed actuation means. For this purpose, the third valve can be configured as a volume flow divider.

Further preferred exemplary embodiments of the hydraulic arrangement are distinguished by the fact that the first valve can be connected upstream of the transmission cooling means and/or the transmission lubricating means. It is advantageously possible to connect, by means of the first valve, the volume flow which is branched off by means of the third valve optionally either to the transmission cooling means and/or lubricating means or to the clutch cooling means. By means of the first to third valves, the total volume flow of the hydraulic energy source of the hydraulic arrangement can advantageously be fed in a prioritized fashion to the downstream consumers, in particular the pressure accumulator, the clutch cooling means and/or the transmission lubricating means and/or transmission cooling means.

The object is also achieved with a cooling oil valve of a hydraulic arrangement for controlling a twin-clutch transmission of a motor vehicle, wherein the cooling oil valve has a first valve, described above. The advantages which have been described above are obtained.

In one preferred exemplary embodiment of the cooling oil valve there is provision that the hydraulic arrangement is embodied as described above. The advantages which are described above are obtained.

The object is also achieved with a motor vehicle having a hydraulic arrangement as described above and/or a cooling oil valve as described above. The advantages which are described above are obtained.

Further advantages, features and details of the invention emerge from the following description in which an exemplary embodiment is described in detail with reference to the drawing. Identical, similar and/or functionally identical parts are provided with identical reference symbols. In the drawing.

Figure 1:
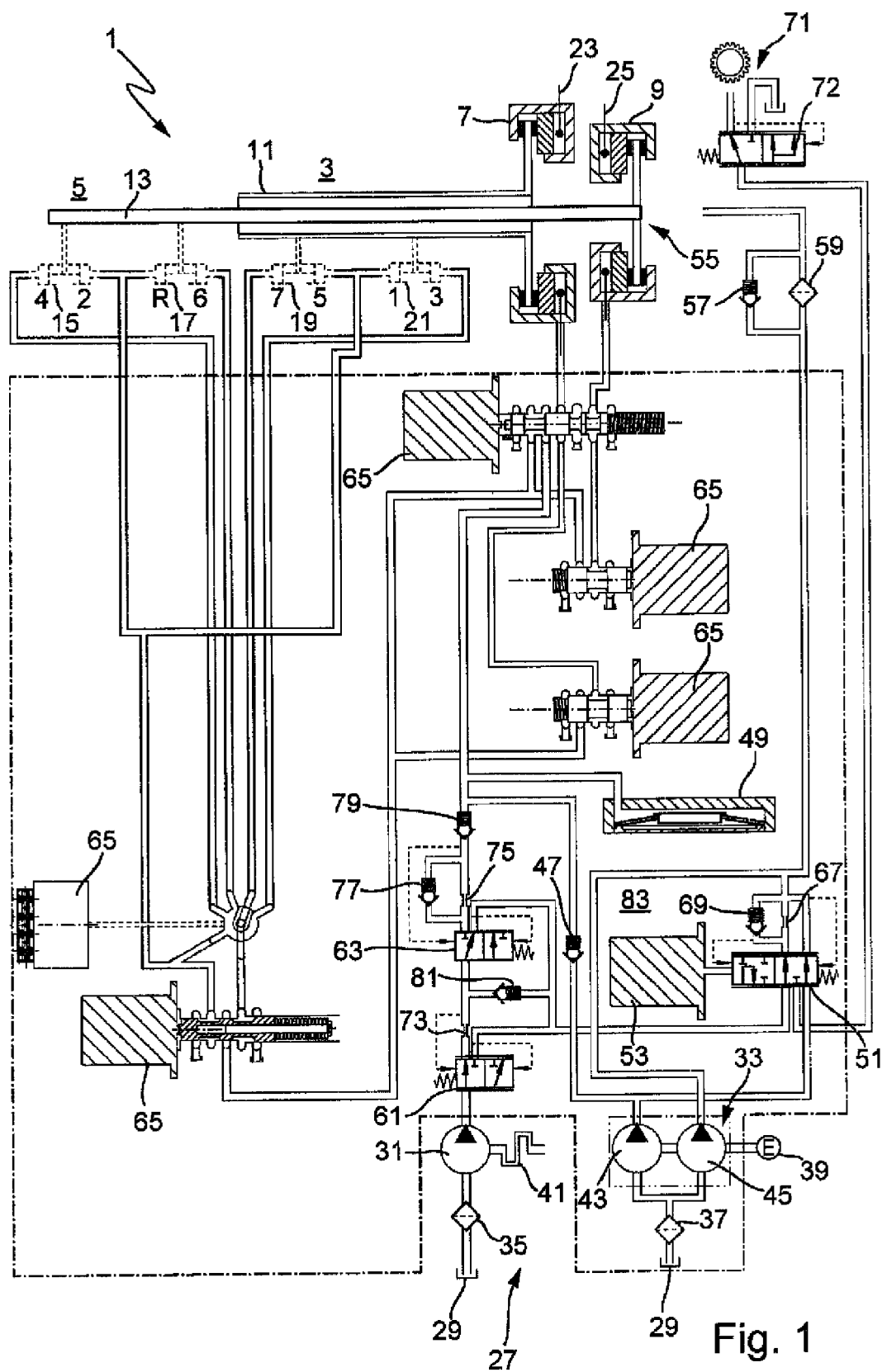
FIG. 1 shows a block diagram of a hydraulic arrangement having a transmission cooling means and/or transmission lubricating means.

FIG. 1 shows a block diagram of a hydraulic arrangement 1 for controlling a twin-clutch transmission 3 of a motor vehicle 5. The twin-clutch transmission 3 has a first clutch 7 and a second clutch 9, by means of which a drive shaft (not illustrated), which is driven by an internal combustion engine of the motor vehicle 5, can be coupled selectively to input shafts 11, 13 in a rotationally fixed fashion. A first input shaft 11 is hollow, and a second input shaft 13 extends through the first input shaft 11. The input shafts 11 and 13 can also be connected in a rotationally fixed fashion via switchable wheelsets (not illustrated in more detail) to a common output shaft (likewise not illustrated) of the twin-clutch transmission 3. In the illustrated example, the first input shaft 11 is associated here with a first partial transmission, with which gear speeds 1, 3, 5 and 7 can be shifted. The second input shaft 13 is associated with a second partial transmission, with which gear speeds 2, 4, 6 and R can be shifted. Transmission actuators, which can be actuated by means of the hydraulic arrangement 1 in order to engage the gear speeds are denoted by the reference symbols 15, 17, 19 and 21. Clutch actuators, with which the first and second clutch 7, 9 can be activated, are denoted by the reference symbols 23 and 25. The hydraulic arrangement 1 is configured to actuate the actuators 15 to 25. The hydraulic arrangement 1 or the actuators 15 to 25, respectively can be supplied with hydraulic energy by means of a hydraulic energy source 27 by means of a hydraulic medium (not illustrated in more detail). The hydraulic energy source 27 is assigned on the intake side to a tank 29 of the hydraulic medium. The hydraulic energy source 27 has a burner pump 31 and a dual-flow electric pump 33. The burner pump 31 is assigned to the tank 29 on the intake side via a first filter 35. The electric pump 33 is assigned on the intake side to the tank 29 via a second filter 37. It is conceivable, instead of the filters 35 and 37, to use a common filter (not illustrated in more detail). The electric pump 33 can be supplied with mechanical energy by means of an electric motor 39. The burner pump 31 can be assigned mechanically to, for example, a crankshaft 41 (only indicated in FIG. 1) of the internal combustion engine (not illustrated in more detail) of the motor vehicle 5.

The electric pump 33 has a first flow 43 and a second flow 45. The first flow 43 can be configured to deliver a comparatively high pressure level, and said first flow 43 is assigned to a pressure accumulator 49 via a non-return valve 47. The non-return valve 47 prevents a return flow from the pressure accumulator 49 in the direction of the first flow 43. The electric pump 33 may, for example, be a vane-type pump, in particular a pump which is integrated into a hydraulic plate (not illustrated in more detail) of the hydraulic arrangement 1. The first flow 43 can also be configured to make available a smaller volume flow than the second flow 45. The first flow is assigned upstream to a first valve 51 or a cooling oil valve by means of a branch. The first valve 51 is configured as a 5/2-way proportional valve which can be actuated by means of a proportional magnet 53. In a first switched position (shown in FIG. 1), the first flow 43 is assigned to a clutch cooling means 55 via the first valve 51. In this switched position, the pressure level of the first flow 43 drops, with the result that the non-return valve 47 closes, in which case the volume flow, delivered at a low pressure level, of the hydraulic medium can be fed to the clutch cooling means 55. The shaft power of the electric motor 39 advantageously decreases. The first flow 43 is assigned to the clutch cooling means 55 via a filter 59 which is connected parallel to a bypass valve 57.

The second flow 45 is assigned directly to the clutch cooling means 55 via the bypass valve 57 and the filter 59. In the switched position of the first valve 51, which is shown in FIG. 1, both flows 43 and 45 are therefore delivered to the clutch cooling means 55. The burner pump 31 is assigned to the actuators 15 to 25 of the hydraulic arrangement 1 via a second valve 61 and a third valve 63, which may each be configured as volume flow dividers. Various electrically actuable control valves 65 are provided for actuating the actuators 15 to 25, the interaction of which control valves 65 is substantially known and therefore does not need to be described in more detail. The valves 61 and 63 can each have pressure return lines, can be configured as proportional valves as well as volume flow dividers. The second valve 61 branches off the volume flow of the hydraulic medium made available by means of the burner pump 31 to an input side of the first valve 51. In the switched position of the first valve 51 which is shown in FIG. 1, an output side of the second valve 61 is assigned to the clutch cooling means 55 via an orifice 67 which is arranged downstream of the first valve 51 and/or a spherical bypass valve 69 which is connected parallel to the orifice 67. In a second switched position of the first valve 51, the burner pump 31 can be assigned directly to a transmission cooling means 71 or transmission lubricating means in accordance with the switched position of the second valve 61. A fourth valve 72, which can branch off a partial flow in the direction of the tank 29 as a function of the pressure and/or volume flow, is connected between the first valve 51 and the transmission cooling means 71. The fourth valve 72 can be configured as a proportional valve.

The second valve 61 is assigned to the third valve 63 upstream via a control orifice 73. Upstream, the third valve 63 can be assigned to the pressure accumulator 49 and to the other consumers of the hydraulic arrangement 1 via a further control orifice 75, a non-return valve 77, connected parallel to this control orifice 75, and a further non-return valve 79, connected downstream of the control orifice 75 and the non-return valve 77. The third valve 63 also branches in the direction of the input side of the first valve 51. Furthermore, a connecting line between the second valve 61 and the third valve 63 also branches in the direction of the input side of the first valve 51 via a pressure control valve 81.

The first to third valves 51, 61, 63 and the burner pump 31 and the electric pump 33 are parts of a prioritization means 83. The prioritization means 83 can be configured to supply the various loads, in particular the actuators 15 to 25, the pressure accumulator 49, the clutch cooling means 55 and/or the transmission cooling means or transmission lubricating means 71 in a way which is prioritized and/or optimized in terms of energy consumption. By actuating the prioritization means 83, the supply to the pressure accumulator 49 can advantageously be prioritized over that to the clutch cooling means 55, and the supply to the clutch cooling means 55 can advantageously be prioritized over that to the transmission lubricating means or transmission cooling means 71.

Figure 2:
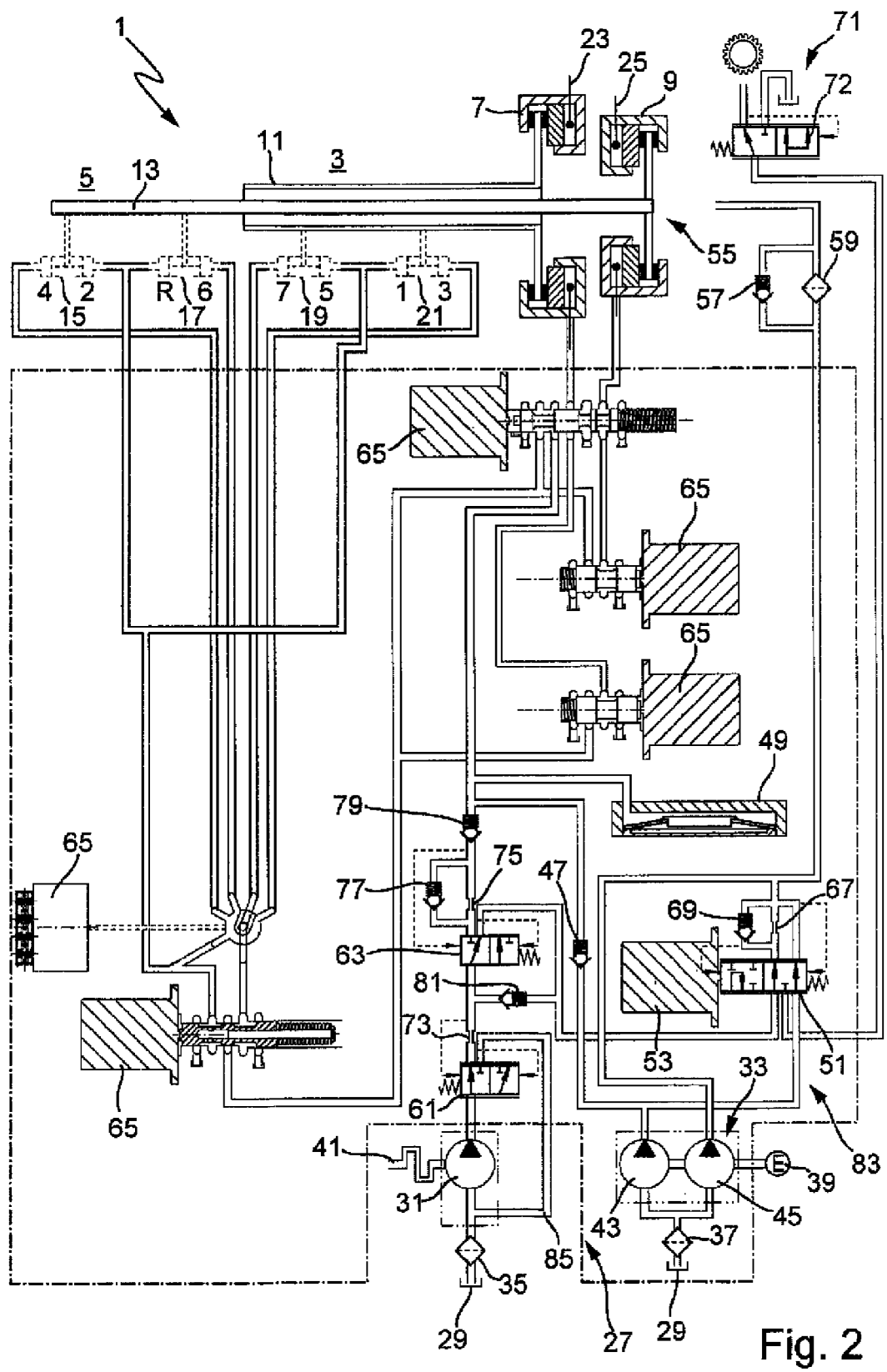
FIG. 2 shows a block diagram of the hydraulic arrangement shown in FIG. 1, but with a tank return line of a burner pump.

FIG. 2 shows the block diagram of the hydraulic arrangement 1 which is shown in FIG. 1, and here, in contrast, the burner pump has a tank return line 85 which has an output side of the second valve 61 with an intake side of the burner pump 31. The tank return line 85 can be configured as a suction-side pump injector, that is to say can open directly into the suction side of the burner pump 31.

Figure 3:
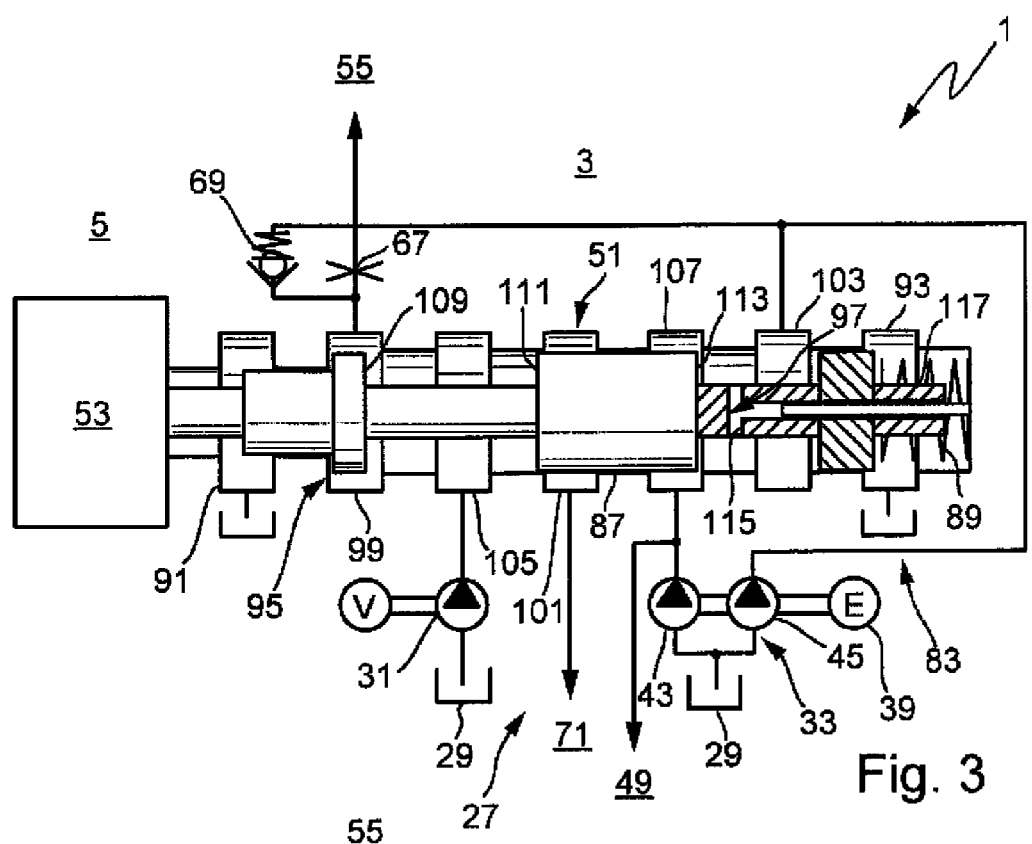
FIGS. 3 to 5 show views of details of a hydraulic arrangement with a first valve in three different switched positions.
Figure 4:
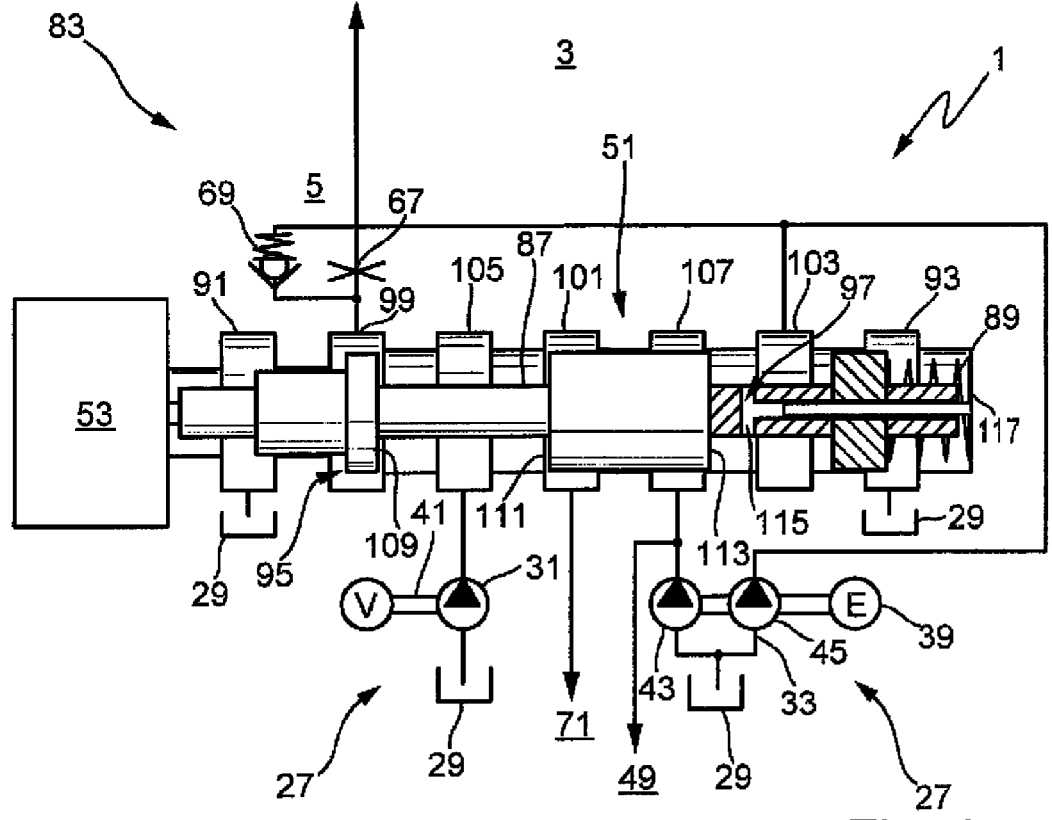
Figure 5:
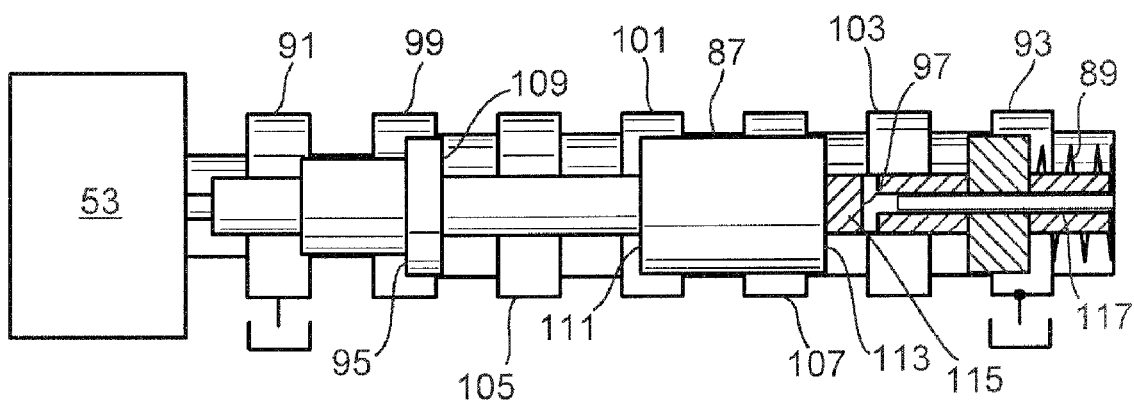

FIGS. 3 and 4, respectively, show a view of a detail of a hydraulic arrangement 1, which corresponds substantially to the hydraulic arrangement 1 illustrated in FIGS. 1 and 2, in particular together with a schematic functional view of the first valve 51. FIG. 5 shows the functional view of the first valve 51 illustrated in FIGS. 3 and 4, with FIGS. 3 to 5 showing the first valve 51 in three different main positions. The function and the design of the first valve 51 will be explained in more detail with reference to FIGS. 3 to 5.

The first valve 51 has a control piston 87 which interacts with lamellas. The control piston 87 is movably mounted between a spring 89 and the proportional magnet 53. The first valve 51 has, in the orientation of the FIGS. 3 to 5, a first tank lamella 91 on the left-hand side and a second tank lamella 93 on the right-hand side. The tank lamellas 91 and 93 are each assigned to the tank 29, that is to say to a low pressure level. The control piston 87 has a first return surface 95 and a second return surface 97.

In addition to the tank lamellas 91 and 93, the first valve 51 has three further lamellas on the output side, and in the orientation of the FIGS. 3 to 5 from left to right, a first clutch cooling lamella 99, a transmission lamella 101 and a second clutch cooling lamella 103. On the input side, the first valve 51 has a burner lamella 105 and an electric lamella 107.

FIG. 3 shows the first valve 51 in a first main position, in which the proportional magnet 53 is switched off. In this switched position, the spring 89 presses the control piston 87, when viewed in the orientation of FIG. 3, entirely to the left to such an extent that it abuts against the first clutch lamella 99. In the first main position, a first control edge 109 of the control piston 87 entirely clears the burner lamella 105 in the direction of the first clutch lamella 99. Furthermore, in this first main position a second control edge 111 closes the transmission lamella 101, with the result that hydraulic medium cannot flow from the burner lamella 105 in the direction of the transmission cooling means 71 via the transmission lamella 101. Furthermore, in the first main position a third control edge 113 of the control piston 87 opens the electric lamella 107 in the direction of the second clutch cooling lamella 103. It is apparent that in this first main position, that is to say when the proportional magnet 53 is switched off, the entire volume flow of the hydraulic energy source 27, that is to say of the burner pump 31 and of the electric pump 33, can be conducted to the clutch cooling means 55 by means of the first valve 51.

In the region of the second clutch cooling lamella 103, the control piston 87 has a slide 117 which can be assigned to the second clutch cooling lamella 103 via a bore 115. The slide 117 connects the second clutch cooling lamella 103 in the direction of the second tank lamella 93 as a function of the pressure and as a function of the switched position of the control piston 87, with the result that a pressure-dependent and position-dependent portion of the volume flow delivered by the first flow 43 of the electric pump 33 can be diverted to the tank 29.

In a second main position of the first valve 51 as illustrated in FIG. 4, the control piston 87 is in a state of equilibrium of the forces applied to the control piston 87 by means of the return surfaces 95 and 97, the spring 89 and the proportional magnet 53. The control edges 109 and 111 are in a state of control equilibrium here, with controlled and desired pressure conditions and volume flow conditions being set at the clutch cooling means 55 and at the transmission cooling means 71 in accordance with energization of the proportional magnet 53. In this second main position, the third control edge 113 shuts off the second clutch cooling lamella 103, with the result that the first flow 43 of the electric pump 33 operates at a higher pressure level in accordance with a pressure of the pressure accumulator 49, and in doing so charges the pressure accumulator 49. The pressure accumulator 49 is assigned via a branch to the first flow 43 and the electric lamella 107 of the first valve 51.

In a third main position of the first valve 51 as shown in FIG. 5, the proportional magnet 53 is energized to a maximum degree, with the result that the control piston 87 of the first valve 51 abuts, viewed in the orientation of FIG. 5, on the right-hand side, that is to say the spring 89 is shortened to a maximum degree. In this state, the slide 119 is closed. Likewise, the electric lamella 107 is shut off from the second clutch cooling lamella 103 by means of the third control edge 113. Furthermore, the burner lamella 105 is shut off from the first clutch lamella 99 by means of the first control edge 109. The second control edge 111 is opened to a maximum degree, with the result that the entire volume flow, generated by means of the burner pump 31, of the hydraulic medium can be fed, as it were, without impedance to the transmission cooling means 71.

The loading of the electric motor 39 can advantageously be minimized using the prioritization means 83. The first valve 51 carries out a cooling oil valve function, which permits it to carry out lubrication of gearwheel stages of a transmission of the twin-clutch transmission 3 using the transmission cooling means and/or transmission lubricating means 71. The hydraulic energy which is required for this can advantageously be minimized and generated according to requirements. Overall, a concept with the smallest possible transmission losses, together with automated activation by means of a clutch actuator system, a transmission actuator system and the provided clutch cooling means 55 and transmission cooling means 71 is advantageously realized.

The prioritization means 83 has the valves 51, 61 and 63, wherein it is possible to ensure charging of the pressure accumulator 49 by the second valve 61, the clutch cooling means 55 by means of the first valve 51 and the transmission lubricating means 71 by means of the first valve 51 and/or the fourth valve 72. The electric pump 33 can be embodied as a dual-flow pump, for example as a vane-type pump. The two flows 43 and 45 deliver at a low pressure during cooling. When the pressure accumulator 49 is charged, only the first flow 43 is at a high pressure level, in which case overall comparatively low loading of the electric motor 39 occurs. The pump flows 43 and 45 of the electric pump 33 can preferably be divided asymmetrically. The first flow 43, which can be used to charge the pressure accumulator 49, can be configured smaller. The electric pump 33 can preferably be configured as a vane-type pump which is integrated into a hydraulic plate of the hydraulic arrangement 1.

Upstream, the burner pump 31 is assigned to the second valve 61 which can implement a volume flow divider in order, in particular, to advantageously reduce the shaft power taken up by the burner pump 31 at high rotational speeds of the crankshaft 41 of the internal combustion engine of the motor vehicle 5.

The first valve 51 can be embodied as a proportional valve. In the currentless state of the proportional magnet 53, all the oil or hydraulic medium, which arrives at the first valve 51, is conducted in the direction of the clutch cooling means 55. In this situation, the measuring orifice 67 for controlling the volume flow via the spherical bypass valve 69 is bypassed in order to keep the system pressure as low as possible. The continuous supply of oil to the clutches 7, 9 is provided by selectively energizing the first valve 51. The spherical bypass valve 69 is closed in the process. A hydraulic control circuit via the measuring orifice 67 is active here (compare FIG. 4). The extracted oil or hydraulic medium is fed to the transmission lubricating means 71 for further use. In the case of maximum energization of the first valve 51 (compare FIG. 5), the entire oil flow is conducted to the transmission lubricating means 71 by the mechanically driven burner pump 31. At the same time, the connection of the first flow 43 or high-pressure flow 43 of the electric pump 33 in the direction of the clutch cooling means 55 is shut off. This is necessary in order to be able to charge the pressure accumulator 49 in stop phases of the motor vehicle 5, for example at traffic lights. For this purpose, the motor vehicle 5 can be equipped with a start/stop device and/or a hybrid drive.

The fourth valve 72, which is connected upstream of the transmission cooling means 71, can be provided for controlling the volume flow at the transmission lubricating means 71 in order to keep possibly occurring losses of hydraulic energy as small as possible. The fourth valve 72 can be integrated as a simple plastic valve outside a hydraulic unit of the hydraulic arrangement 1, for example in a lubricating oil distribution means.

It is advantageously possible to provide, as an alternative to the illustration in FIGS. 1 and 2, a common filter for the pumps 31 and 33 of the hydraulic energy source 27.

It is conceivable for the mechanically driven burner pump 31 also to be embodied as a vane-type pump, in particular as a vane-type pump which is integrated into the hydraulic plate of the hydraulic arrangement 1.

Basically two variants are possible for the switching or operating mode of the second valve. In a first variant, the second valve 61 can be set to a breakaway quantity according to a charging requirement of the pressure accumulator 49, in which case optimum conditions are produced for the storage layers of the pressure accumulator 49, but a large volume flow via the first valve 51 occurs at high rotational speeds. In a second operating mode, the second valve 61 can be set to a breakaway quantity according to a cooling oil requirement of the clutch cooling means 55, in which case a quantity of oil which is appropriate for requirements advantageously occurs at the first valve 51 but a comparatively large volume flow is branched in the direction of the third valve 63 as a function of the rotational speed. Any desired mini/max optimization is conceivable between the first and second operating states.

The second valve 61 can be configured as a volume flow divider.

The first valve 51 corresponds substantially to a controlled volume flow valve. In addition, the first valve 51 has the electric lamella 107 and the second clutch cooling lamella 103, which make it possible either to switch the additional volume flow of the electric pump 33 to the quantity of cooling oil in the direction of the clutch cooling means 55 or to block the volume flow of the electric pump 33 in order to be able to build up pressure for charging the pressure accumulator 49. The first valve 51 can be placed in three different main positions by means of the proportional magnet 53.

In a first main position, as illustrated in FIG. 3, the valve energization is switched off entirely, that is to say the proportional magnet 53 is switched off. In this first main position, maximum cooling 55 of the clutch occurs. If a large quantity of cooling oil is required for the clutch cooling means 55 at low rotational speeds of the crankshaft 41 of the internal combustion engine of the motor vehicle 5, the total volume flow of the burner pump 31, and additionally the volume flow of the two flows 43 and 45 of the electric pump 33, can be conducted to the clutch cooling means 55 by means of the first valve 51.

The orifice 67 which is connected downstream of the first clutch lamella 99 can be configured to control the volume flow in a second main position (compare FIG. 4). However, since in the first main position according to FIG. 3 the entire volume flow for the clutch cooling means 55 would have to flow through the orifice 67—which would give rise to a comparatively large back pressure—the spherical bypass valve 69 is connected parallel to the orifice 67, said spherical bypass valve 69 advantageously opening at a specific pressure and consequently avoiding excessively large throttling losses.

In the second main position of the first valve 51 (compare FIG. 4), medium energization of the valve is applied to the proportional magnet 53. Given this medium energization, only part of the volume flow of the hydraulic medium flows via the orifice 67, with the rest of the volume flow being passed on to the transmission lubricating means 71. In this second main state, the first valve 51 functions as a volume flow control valve. The pressure difference which builds up at the orifice 67 is conducted onto the first return surface 95 upstream of the orifice 67, and onto the second return surface 97 downstream of the orifice 67. In this way, a state of equilibrium is advantageously established between the proportional magnet 53, the spring 89 and the two return surfaces 95, 97, which state of equilibrium can bring about a desired quantity of cooling oil as a function of a magnet current of the proportional magnet 53.

In a third main position of the first valve 51, which corresponds to maximum energization of the proportional magnet 53, the connection between the burner pump 31 and the clutch cooling means 55 is completely closed. This is advantageous if the quantity of cooling oil at the clutches 7 and 9 of the twin-clutch transmission 3 is to be reduced to zero. If the internal combustion engine is stationary, this third main position can also be used to close off the first flow or high-pressure flow 43 of the electric pump 33 with a maximum possible overlap. This first flow 43 can advantageously be used here to build up pressure which can then be used to charge the pressure accumulator 49.

In particular, the fourth valve 72 can have the slide 117, which clears a cross section to the tank 29 as a function of a back pressure of the transmission cooling means or transmission lubricating means 71, in order to avoid the entire excess volume flow from being discharged via the transmission lubricating means at high rotational speeds of the internal combustion engine.

LIST OF REFERENCE NUMERALS

1 Hydraulic arrangement
3 Twin-clutch transmission
5 Motor vehicle
7 First clutch
9 Second clutch
11 Input shaft
13 Input shaft
15 Transmission actuators
17 Transmission actuators
19 Transmission actuators
21 Transmission actuators
23 Clutch actuators
25 Clutch actuators
27 Hydraulic energy source
29 Tank
31 Burner pump
33 Duel-flow electric pump
35 First filter
37 Second filter
39 Electric motor
41 Crankshaft
43 First flow
45 Second flow
47 Non-return valve
49 Pressure accumulator
51 First valve
53 Proportional magnet
55 Clutch cooling means
57 Bypass valve
59 Filter
61 Second valve
63 Third valve
65 Control valves 67 Orifice
69 Spherical bypass valve
71 Transmission cooling means
72 Fourth valve
73 Control orifice
75 Control orifice
77 Non-return valve
79 Non-return valve
81 Pressure control valve
83 Prioritization means
85 Tank return line
87 Control piston
89 Spring
91 First tank lamella
93 Second tank lamella
95 First return surface
97 Second return surface
99 First clutch cooling lamella
101 Transmission lamella
103 Second clutch cooling lamella
105 Burner lamella
107 Electric lamella
109 First control edge
111 Second control edge
113 Third control edge
115 Bore
117 Slide

The invention claimed is:

1. A hydraulic arrangement for controlling a twin-dutch transmission of a motor vehicle, comprising:
   a first pump;
   a second pump;
   a valve;
   a hydraulic energy source for supplying hydraulic energy to the hydraulic arrangement by a hydraulic medium;
   a pressure accumulator for storing the hydraulic energy;
   a clutch cooling means for cooling clutches of the twin-clutch transmission with a hydraulic medium;
   a transmission lubrication means and/or a transmission cooling means for cooling and/or lubricating the twin-clutch transmission with the hydraulic medium; and
   a prioritization means or a prioritization device prioritizing a supply of the hydraulic medium to the pressure accumulator and to the clutch cooling means, and prioritizing the supply of the hydraulic medium to the clutch cooling means and to the transmission lubricating means and/or transmission cooling means,
   wherein the first pump and the second pump are separately driven and individually connected to the valve, the valve in turn is connected to the clutch cooling means and the transmission cooling and lubricating means, and one of the pumps is connected to a clutch actuation system.

2. The hydraulic arrangement of claim 1, wherein the second pump is a dual flow electric pump.

3. The hydraulic arrangement of claim 2, wherein the dual-flow electric pump has a first flow which is connected upstream of the pressure accumulator.

4. The hydraulic arrangement of claim 3, wherein the dual-flow electric pump has a second flow which is connected upstream of the clutch cooling means.

5. The hydraulic arrangement of claim 3, wherein the first flow is connected upstream of the clutch cooling means.

6. The hydraulic arrangement of claim 3, wherein the first flow is connected upstream of the pressure accumulator via a nonreturn valve.

7. The hydraulic arrangement of claim 3, wherein the first flow is connected upstream of the clutch cooling means via the valve.

8. The hydraulic arrangement of claim 7, wherein the valve is a proportional valve.

9. The hydraulic arrangement of claim 7, wherein the valve is actuated by means of a proportional magnet.

10. The hydraulic arrangement of claim 9, wherein, in a currentless state of the proportional magnet of the valve, a total volume flow of the hydraulic medium which is delivered by means of the hydraulic energy source is fed to the clutch cooling means.

11. The hydraulic arrangement of claim 2, wherein the hydraulic energy source comprises the electric pump and the first pump, the first pump being a burner pump.

12. The hydraulic arrangement of claim 11, wherein the prioritization means or the prioritization device has the valve as a first valve, a second valve connected downstream of the burner pump, and a third valve connected downstream of the second valve.

13. The hydraulic arrangement of claim 12, wherein the second valve is connected upstream of the first valve, wherein a volume flow of the hydraulic medium, which is delivered by means of the burner pump, is fed alternatively either to the third valve or to the first valve.

14. The hydraulic arrangement of claim 12, wherein the second valve has a tank return line for at least partially short-circuiting the burner pump.

15. The hydraulic arrangement of claim 14, wherein the third valve is alternatively connected upstream of a clutch actuation means and/or gear speed actuation means of the hydraulic arrangement, and upstream of the first valve.

16. The hydraulic arrangement of claim 12, wherein the first valve is connected upstream of the transmission cooling means and/or the transmission lubricating means.

* * * * *